United States Patent Office 3,132,181
GLYOXAL 1-(2')-(2,4-DIHYDROXY-2-BUTENAL)-1-(3')-(D-ERYTHROSE) ACETAL
Lewis A. Gugliemelli, Pekin, Ill., Gary L. Mayer, Madison, Wis., and Charles R. Russell, Peoria, Ill., assignors to the United States of America as represented by the Secretary of Agriculture
No Drawing. Filed Oct. 26, 1962, Ser. No. 233,486
4 Claims. (Cl. 260—602)
(Granted under Title 35, U.S. Code (1952), sec. 266)

A nonexclusive, irrevocable, royalty-free license in the invention herein described, throughout the world for all purposes of the United States Government, with the power to grant sublicenses for such purposes, is hereby granted to the Government of the United States of America.

This invention relates particularly to the preparation of the novel compound glyoxal 1-(2')-(2,4-dihydroxy-2-butenal)-1-(3')-(D-erythrose) acetal, a new and unique monomeric trialdehyde having an enol-acetal linkage and possessing three chemically identifiable aldehyde groups, one carbon to carbon double bond, and 3 hydroxyl groups. Our new compound which also exists in part in the cyclic hemiacetal form may be represented by the following classical structural formula.

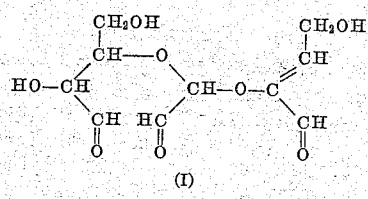

(I)

A principal object of our invention is a process of catalytically depolymerizing dialdehyde starch that has been obtained by a substantially complete oxidation of a vegetable starch such as cornstarch, wheat starch, tapioca starch, etc., by periodate so that at least 90–95 percent of the anhydroglucose units (AGU's) are in the dialdehyde form to yield new and useful products.

A more specific object is a process of depolymerizing the above described dialdehyde starch (DAS) in a mildly alkaline non-aqueous medium to provide large yields particularly of a novel trialdehyde compound, namely glyoxal 1 - (2') - (2,4 - dihydroxy - 2 - butenal) - 1 - (3') - (D-erythrose) acetal that has exceptional crosslinking activity towards proteins and other polymers.

Other objects will become apparent to one skilled in the art in the course of the following detailed disclosure and claims.

Monomeric polyaldehydes are widely employed in industry for a variety of applications. Considerable utility has been found for these compounds in the tobacco industry as leaf binders, in the leather industry to accelerate and facilitate the tanning of hides, and in the pharmaceutical and chemical industries as drug and chemical intermediates. Further, they are widely employed as insolubilizers for protein adhesives and as crosslinking agents in polymer production.

Our novel compound, glyoxal 1-(2')-(2,4-dihydroxy-2-butenal)-1-(3')-(D-erythrose) acetal (I), which we will for convenience also refer to as the "trialdehyde," has been found to behave like a typical polyaldehyde toward protein material. For example, a 20 percent solution of gelatin treated with 5 percent of the trialdehyde (based on the weight of gelatin) was found to form a gel even at 70° C., which gel remained insoluble upon being boiled in water for a period of one hour. An untreated 20 percent gelatin gel dissolved readily in water at 40° C. Other demonstrations of the utility of the trialdehyde were observed in its ability to impart excellent wet-rub resistance to casein-pigment paper coatings by a protein insolubilization resulting from the crosslinking of the protein polymer chains. The addition of one part of trialdehyde to 12 parts of casein and 100 parts of clay produced a coating composition which when applied to paper and air dried lost only 1.5 percent of its coating, when tested for wet-rub resistance on an Adams Coating Tester with an arm weight of 1040 grams and a rotating drum speed of 1 r.p.m. (Adams, TAPPI 43, 923–927 (1960)). Further we found that when the addition of the trialdehyde was as little as one-eighth part for 12 parts of casein and 100 parts of clay and the coated paper strips dried at 150° C. for one minute that no measurable weight of coating was removed by the above method. The control strips which were not trialdehyde-treated were found to lose 90 percent of their coatings when subjected to the same test.

As already indicated, the starting material for the preparation of our novel trialdehyde is a dialdehyde starch in which at least about 93 percent of the repeating units are in the dialdehyde form (U.S. Patent No. 2,713,553). This polymer per se has considerable industrial utility as a wet-strength additive for paper and is now a commercially available chemical. The only works reported in the literature pertaining to the alkaline degradation of dialdehyde starch and dialdehyde cellulose are those of Whistler et al., J.A.C.S. 81, 3133 (1959), and of O'Meara et al., J.C.S. 4504 (1958). These workers employed large ratios of alkali to OAGU (oxidized anhydroglucose units), i.e., 2 to 1 and in solutions of low dialdehyde starch contents, 5 percent. These reactions were carried out in water to yield complex mixtures of alpha hydroxy acids such as glycolic and 2,4-dihydroxybutyric acids as well as formic acid, carbon dioxide, and other acids of low chromatographic mobility. Our process for the alkaline degradation of dialdehyde starch is distinguished in that only a catalytic amount of sodium methoxide (1 mole of sodium methoxide to 60 moles of DAS) is required and the reaction is carried out in an anhydrous solvent such as methanol at a dialdehyde starch concentration of about 60 percent. Most importantly, instead of hydroxy acids, we obtain monomeric aldehydes, principally the novel compound glyoxal 1-(2')-(2,4-dihydroxy-2-butenal)-1-(3')-(D-erythrose) acetal plus glyoxal and a very small amount of 2-O-(α-D-glucopyranosyl)-2,4-dihydroxy - 2 - butenal. The formation of these compounds was unexpected and wholly unpredictable in view of the closest prior art.

Our process involves first the preswelling of essentially dry highly oxidized dialdehyde starch with anhydrous methyl alcohol which preswelling is accompanied by considerable heat of solution that causes the reaction temperature to rise to 35–40° C. After the temperature of the mixture is lowered to 20° C., sufficient sodium methoxide in methyl alcohol is added to the mixture to provide one mole of alkaline catalyst to 60 moles of DAS. The aldehyde content of the reaction mixture as measured by the gasometric sodium borohydride method was found to increase steadily and finally reaches a plateau value after 12 hours which is 25 percent higher than the initial aldehyde content and the reaction mixture then is neutral. It was shown by subsequent experiments that the reaction, based on a maximu aldehyde content, is essentially complete at this stage. For example, the addition of one more mole of catalyst per 60 moles of DAS did not increase the aldehyde content as would be the case if the prior reaction were incomplete. Actually with the larger amount of catalyst the aldehyde content decreased about 3 percent. Further, the substitutition of potassium methoxide, lithium methoxide, and barium dimethoxide as catalysts in the reaction at the same molar concentrations as sodium methoxide gave the same aldehyde contents which again were 25 percent greater than the initial aldehyde value of the mixture.

It was also found that when the sodium methoxide concentration in the reaction was increased to 1 mole for 15 moles of DAS and the reaction conducted at 2° C., the same 25 percent increase in the aldehyde content was finally obtained although the reaction mixture maintained at this low temperature continued to remain strongly basic even after 5 days of reaction.

It was also determined that the increase in the aldehyde content of the reaction mixture was due almost exclusively to the formation of glyoxal.

From the experimental data a mechanism of depolymerization of dialdehyde starch was formulated which involves chain scissions of β-alkoxy elimination reactions on every second oxidized anhydroglucose unit to yield 1 mole of glyoxal and 1 mole of glyoxal 1-(2')-(2,4-dihydroxy-2-butenal)-1-(3')-(D-erythrose) acetal for every 2 moles of original oxidized anhydroglycose units. As a consequence of the existence of some nonoxidized AGU's in the dialdehyde starch starting material there is also obtained a very minor amount of 2-O-(α-D-glucopyranosyl)-2,4-dihydroxy-2-butenal.

Upon treatment of the depolymerized dialdehyde starch reaction mixture with acetone a 66 percent weight yield of a white amorphous precipitate is obtained which is a mixture of the novel trialdehyde and the very minor amount of 2-O-(α-D-glucopyranosyl)-2,4-dihydroxy-2-butenal. Low temperature distillation at reduced pressure of the acetone, methyl alcohol filtrate yields a syrup-like liquid which upon treatment with additional acetone causes precipitation of a pure fraction of the trialdehyde which amounted to a 15 percent weight yield. The glyoxal formed in the reaction is present in the final acetone filtrate. Other precipitating solvents such as isopropyl alcohol and dioxane were also found suitable for precipitating the trialdehyde from the reaction mixture.

The aldehyde content of our novel trialdehyde was determined with sodium borohydride and was found to consist of 3 carbonyls, the double bond being unaffected. However, 4 moles of hydrogen were taken up by the compound when it was reduced with hydrogen at 2000 p.s.i. with Raney nickel catalyst at 110° C., the double bond being reduceable under these conditions. Evidence for the carbonyl double bond conjugation was obtained from ultraviolet analysis of this compound in water and also in methyl alcohol. It was found to have an $E_{1\ cm.}^{1\%}$ value of 50 at 235 mμ

Finally, it was found that high pressure reduction of our novel trialdehyde at 190° C. yielded 3 polyol compounds which were identified as erythritol, ethylene glycol, and 1,2,4-butenetriol. These compounds were obtained in approximately equivalent molar quantities.

This depolymerization reaction may also be applied to any periodate oxidized polysaccharide in which there is a hydrogen on the carbon alpha to the carbonyl and in which there is also an alkoxy group on the carbon beta to the carbonyl. Examples of such materials are periodate oxidized cellulose, oxidized 1,6-linked dextran and oxidized 1,4-linked xylan. The alkali depolymerized trialdehydic product of the dialdehydes of the said 1,6-dextran and 1,4-xylan are identical and has the following structure

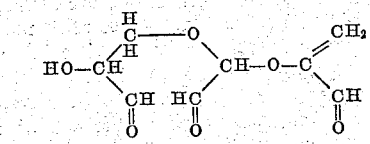

*Example 1*

Dialdehyde starch which had been prepared from starch by periodate oxidation so that 93 percent of its repeating units were in the dialdehyde form was dried to one-half percent moisture content by heating in a forced draft oven at 110° C. for a period of 1½ hours. It was then cooled to room temperature in a vacuum desiccator. To 60 grams of this highly dried dialdehyde starch (0.349 OAGU as determined by the sodium borohydride method) was added 79 grams (2.47 moles) of anhydrous methyl alcohol. The resulting slurry was stirred and considerable heat of solvation was evolved. After the temperature of the reaction mixture was cooled to room temperature (20° C.), 6 ml. of 1 N sodium methoxide (0.006 mole) in methyl alcohol solution was added with rapid stirring. After 10 minutes the mixture had become a gel and stirring was discontinued. After 20 minutes the gel had become a viscous solution, and the stirring of the mixture was resumed. The reaction was found to be essentially complete at the end of 12 hours as determined by a 25 percent increase in the aldehyde content of the mixture, and the reaction mixture was found to be neutral. Reaction at room temperature was allowed to continue overnight. After 18 hours of reaction the viscous solution was added slowly to 600 ml. of acetone with vigorous stirring. A finely divided white amorphous solid, the trialdehyde containing a very minor amount of 2-O-(α-D-glucopyranosyl)-2,4-dihydroxy-2-butenal precipitated. After drying, the precipitate weighed 40 grams. The acetone-methyl alcohol filtrate was then distilled at 40° C. under 20 mm. pressure to yield a syrup-like residue. To this residue was added 100 ml. of fresh acetone resulting in the precipitation of 10 grams of pure trialdehyde. The acetone filtrate contained the glyoxal formed during the course of the reaction.

*Example 2*

Sixty grams of dry dialdehyde starch was treated with 79 grams of anhydrous methyl alcohol in the manner described in Example 1. To the cooled dialdehyde starch methyl alcohol slurry was then added 0.006 mole of lithium methoxide contained in 6 ml. of methyl alcohol and the reaction continued in the same manner described in Example 1. The products were isolated by the same acetone precipitation procedure and the same products in substantially the same yields as Example 1 were obtained.

*Example 3*

Example 1 was repeated except that 0.006 mole of potassium methoxide catalyst was employed in place of sodium methoxide. The same products were obtained as in Example 1 and the yields were essentially the same.

*Example 4*

Example 1 was repeated except that 0.006 mole of barium dimethoxide was employed in place of sodium methoxide. The same products in substantially the same yields were obtained.

*Example 5*

Sixty grams of dry dialdehyde starch was treated with methyl alcohol in the manner described in Example 1. The temperature of this slurry was reduced to 2° C. and 0.024 mole of sodium methoxide in 24 ml. of methanol was added with vigorous stirring. After 40 hours of reaction the products were isolated by acetone precipitation in the same manner as described in Example 1 and the same products in substantially the same yields were obtained.

*Example 6*

Example 5 was repeated using 0.024 mole of each of the following catalysts: lithium methoxide, potassium methoxide, and barium dimethoxide with the same products being obtained in substantially the same yields.

*Example 7*

Sixty grams of dry dialdehyde starch was pretreated with 79 grams of absolute methyl alcohol and then reacted with 6 ml. of 1 N sodium methoxide in the same manner as described in Example 1. The reaction mixture was then distilled at 40° C. at 20 mm. pressure to remove 60 ml. of methyl alcohol. To the syrup-like residue was then added 100 ml. of isopropyl alcohol and this was then again distilled at 40° C. and 20 mm. pressure to remove another 100 ml. of solvent. To this residue was then added 300 ml. of isopropyl alcohol. The trialdehyde was precipitated and subsequently filtered on a Büchner funnel by suction. The weight of dry product amounted to 30 grams. The isopropanol filtrate was concentrated to a syrup-like liquid by vacuum distillation and to this was then added 100 ml. of fresh isopropyl alcohol. This caused the precipitation of another 14 grams of trialdehyde. The newly added isopropyl alcohol contained the glyoxal formed as a result of the depolymerization reaction.

*Example 8*

Example 7 was repeated except that hexyl alcohol was used as the precipitation solvent in place of isopropyl alcohol. The results were essentially the same as obtained in Example 7.

*Example 9*

Example 7 was repeated except that dioxane was used as the precipitating solvent in place of isopropyl alcohol. The results were essentially the same as obtained in Example 7.

It is to be understood that this invention is not restricted to the exact methods hereinbefore described, since obvious modifications will occur to a person skilled in the art in accordance with the principles disclosed herein.

We claim:

1. A process for partially depolymerizing a highly oxidized polysaccharide under essentially anhydrous conditions to obtain a novel trialdehydic compound corresponding to the formula

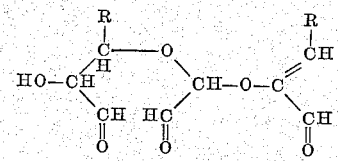

where R is selected from the group consisting of H and $CH_2OH$ said process comprising the steps of slurrying one part by weight of an oven-dried substantially fully oxidized polysaccharide selected from the group consisting of periodate-oxidized dialdehyde starch, periodate-oxidized cellulose, periodate-oxidized 1,6-linked dextran, and periodate-oxidized 1,4-linked xylan in about 1⅓ parts by weight of anhydrous methanol to swell the said polysaccharide, cooling the swollen polysaccharide slurry to not above about 20° C., reacting the slurry with about 1/60 mole equivalent based on the highly oxidized polysaccharide with a methanolic solution of an alkaline catalyst selected from the group consisting of potassium methoxide, sodium methoxide, lithium methoxide, and barium dimethoxide for at least 12 hours at 20° C., pouring the alkali-reacted material into a precipitating solvent member selected from the group consisting of isopropyl alcohol, hexyl alcohol, dioxane, and acetone to precipitate a first crop of crude trialdehydric compound, recovering the filtrate, distilling the filtrate at 40° C. under 20 mm. Hg pressure to form a syrupy solution and adding to the said syrupy solution an additional quantity of the above said precipitating solvent to precipitate a second crop consisting of the pure trialdehyde.

2. The process of claim 1 wherein the precipitating solvent is isopropyl alcohol.

3. The process of claim 1 wherein the precipitating solvent is acetone.

4. Glyoxal - 1 - (2')-(2,4-dihydroxy-2-butenal)-1-(3')-(D-erythrose) acetal.

No references cited.